United States Patent [19]

Chiodini

[11] Patent Number: 5,442,996
[45] Date of Patent: Aug. 22, 1995

[54] HAMBURGER MAKER

[75] Inventor: Daniele S. Chiodini, Bologna, Italy

[73] Assignee: La Minerva Di Chiodini Mario S.r.l., Bologna, Italy

[21] Appl. No.: 122,023

[22] Filed: Sep. 15, 1993

[30] Foreign Application Priority Data

Sep. 16, 1992 [IT] Italy .................. GE92U0057

[51] Int. Cl.6 .................. B01F 15/06; A23B 4/06
[52] U.S. Cl. .................. 99/517; 99/348; 366/145; 62/342; 425/407; 452/174
[58] Field of Search .................. 99/517, 348; 366/144, 366/145, 149, 314; 62/342; 452/174; 425/407

[56] References Cited

U.S. PATENT DOCUMENTS

| 2,648,514 | 8/1953 | Rosier | 366/144 |
|---|---|---|---|
| 2,775,877 | 1/1957 | Bruntjen | 366/144 |
| 3,269,606 | 8/1966 | Armstrong | 366/144 |
| 3,464,220 | 9/1969 | Phelan | 62/342 |
| 3,884,135 | 5/1975 | Lohr | 366/144 |
| 4,535,604 | 8/1985 | Cavalli | 62/342 |
| 4,573,329 | 3/1986 | Cavalli | 62/342 |
| 4,690,669 | 9/1987 | Williams | 366/144 |
| 4,964,333 | 10/1990 | Bravo | 366/149 |

FOREIGN PATENT DOCUMENTS

| 1120396 | 7/1956 | France | 366/149 |
|---|---|---|---|
| 2032614 | 11/1970 | France | 99/348 |
| 2093122 | of 1972 | France | . |
| 2059522 | of 1972 | Germany | . |
| 9206589 | of 1972 | Germany | . |
| 0140845 | 4/1980 | Germany | 366/144 |
| 0041744 | of 1981 | Netherlands | . |
| 809971 | of 1959 | United Kingdom | . |

Primary Examiner—David A. Scherbel
Assistant Examiner—Randall E. Chin
Attorney, Agent, or Firm—McAulay Fisher Nissen Goldberg & Kiel

[57] ABSTRACT

The feed hopper base plate, at least, of the hamburger maker (otherwise known as a hamburger machine), is cooled by suitable means so as to prevent or limit the dripping of liquids contained in the minced meat. This has positive effects as regards the processing of the minced meat, and its preservation even during processing. By keeping the cooling means running, intermittent use of the hamburger maker is possible, without necessitating cleaning of the latter each time it stops.

10 Claims, 2 Drawing Sheets

HAMBURGER MAKER

BACKGROUND OF THE INVENTION

This invention is designed for hamburger makers, otherwise known as hamburger machines.

DESCRIPTION OF THE PRIOR ART

In the current state of the art, the hamburger maker is equipped with a feed hopper, loaded with minced meat which has normally passed through a meat chopper, and fitted with internal blades to mix the meat and force it out of an opening at the base of the feed hopper in compact form. Placed tangentially under this opening is a volumetric batching unit, usually of the rotating type, which is first synchronized with the said opening, filling up with meat and shaping the hamburgers, and then with optional equipment for spreading a flexible, protective film on the visible side of the hamburger. When the volumetric batching unit reaches its downward position, it ejects the shaped hamburger with lower protection, if any, onto an outfeed conveyor.

One problem when using this type of machine is the excessive presence in the minced meat of blood and/or other liquids from the mincing phase, or in some cases caused by earlier refrigeration of the meat. These liquids drip into the volumetric batching unit, dirtying both the unit and the shaped hamburgers which are unloaded onto the outfeed conveyor. They can also render unsafe the operation of any equipment used to cover the hamburger with flexible, protective film. In the above said conditions, it is difficult to process the minced meat, due to its tacky consistency.

A further problem lies in the fact that the hamburger makers are often used intermittently in the course of a working day, and so should be cleaned after each work cycle, a very time consuming operation.

SUMMARY OF THE INVENTION

The applicant has resolved these and other problems with an ingenious, simple, economic and highly reliable solution. This solution requires that at least the base plate of the feed hopper into which the minced meat is loaded should be cooled to the point at which the liquids in the minced meat congeal sufficiently, and the meat itself is conveniently cooled before leaving the feed hopper. The advantage of this solution is that the meat becomes easier to process, partly due to the retention of fat particles in the bottom of the feed hopper and in the various pipes through which the minced meat passes (these pipes are also subject to cooling). At the same time, the meat itself remains within the range of temperatures that guarantees improved preservation. This solution also allows intermittent use of the hamburger maker, which, in contrast to the technique currently used, does not require regular cleaning.

Further features and advantages of the present invention are set forth in the following detailed description, where a preferred embodiment, only illustrative, is disclosed as an example with reference to the accompanying drawings, in which:

DESCRIPTION OF THE PREFERRED EMBODIMENTS

Figure 1:
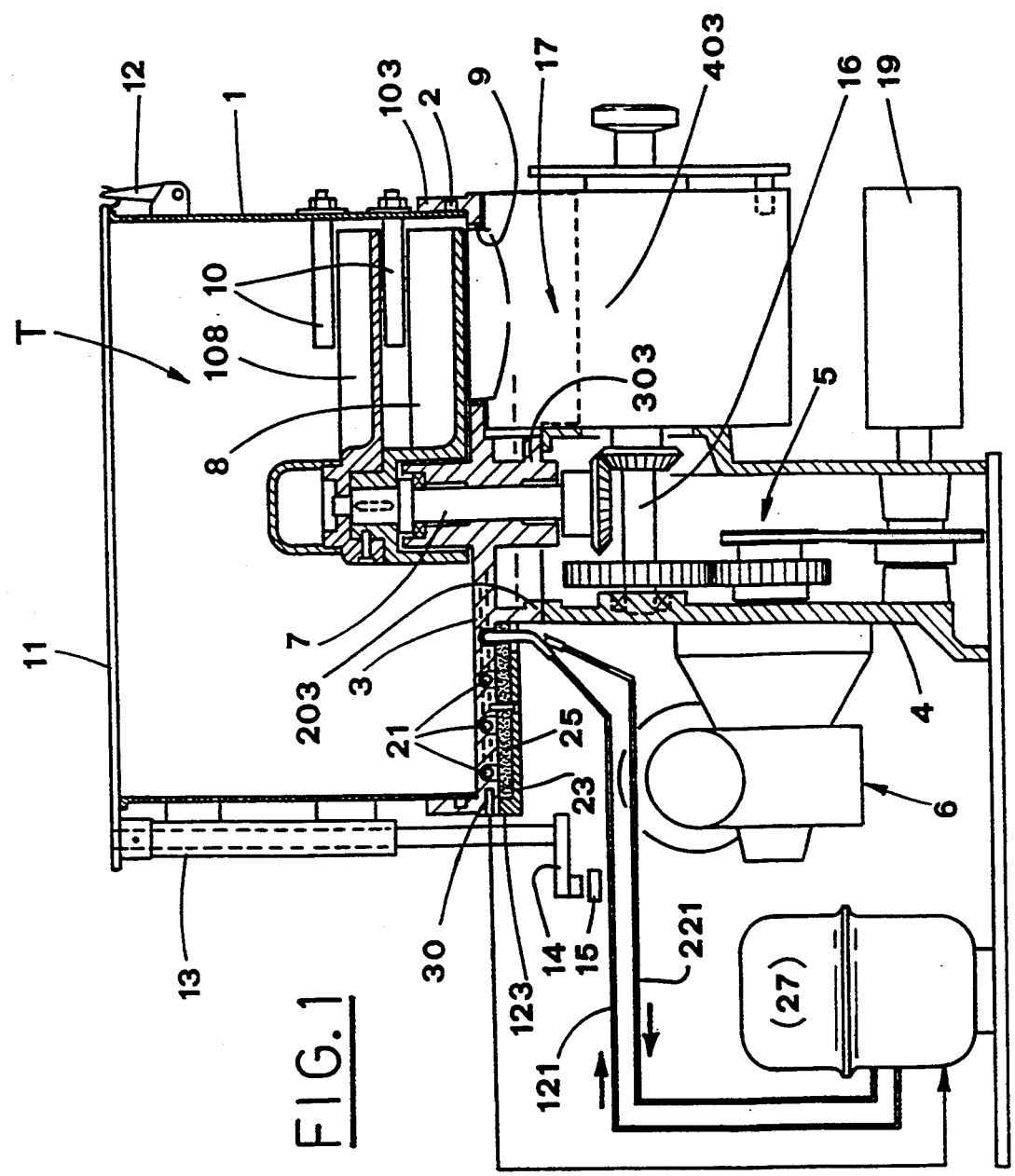
FIG. 1 is a side view of the hamburger maker, with a cross-section of the feed hopper.

In the drawings, T indicates the minced meat feed hopper, with a tubular body 1 whose lower end is joined by a movable bayonet connection 2 to the raised rim 103 of the base plate 3. The lower section of the base plate 3 consists of a box 203, formed of a single part and flange-mounted on the square body 4 of the driving gear box 5, which is connected to the variable speed motor 6. The tubular body 1 may be fixed to the base plate 3 using other means. At the centre of the said base plate 3 is a small vertical box 303, through which the rotating shaft 7 passes. Keyed onto this shaft are the blades 8-108, which stir the meat and force it out of an opening 9 in the base plate 3 in compact form. 10 indicates the contrast fingers fitted inside the feed hopper body 1 to prevent the meat from turning with the movement of the blades 8-108.

The top of the feed hopper body 1 is covered by a lid 11 held shut, for example, by a latch 12 and mounted so that it rotates around a vertical axis 13, with a lower handle 14 connected to a safety sensor 15.

To the side of the gear box body 4, mounted so that it revolves on a horizontal-shaft 16, is a drum 17 with volumetric batching unit for shaping the hamburgers. This operates tangentially with the curved cover 403, forming a single block with the base plate 3 of the feed hopper, and-aligned with the opening 9 through which the minced meat is forced out. 18 indicates the ribs, formed as a single part with the base plate 3 of the feed hopper and fitted at one end of the said cover 403 to support the optional device for spreading films used to cover the shaped hamburgers.

19 indicates one of the conveyor drive rollers, also connected to the driving gear 5, and positioned beneath the shaping drum 17 to collect and carry away the hamburgers shaped during each cycle.

Figure 2:
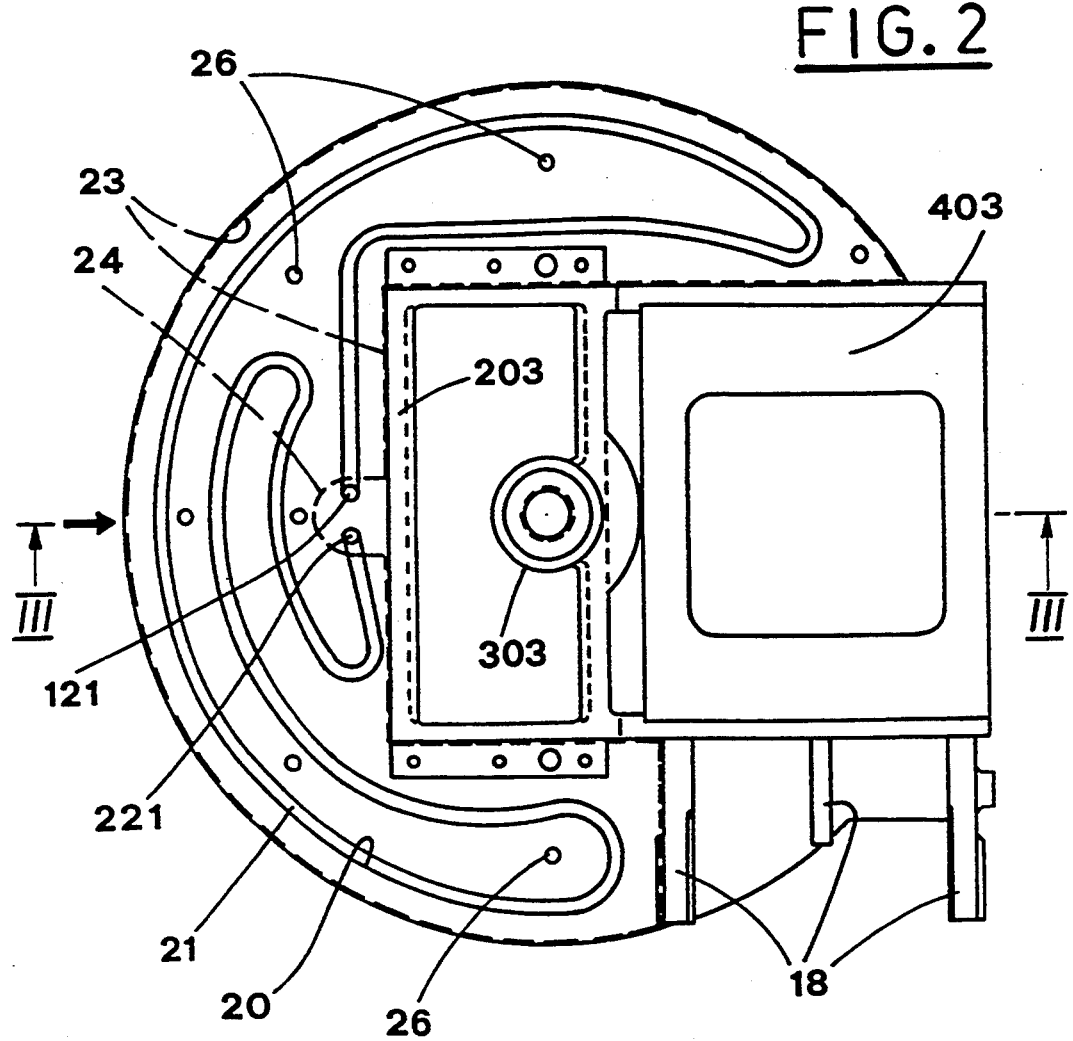
FIG. 2 is a plan, seen from below, of the feed hopper base plate, showing the cooling circuit coil.
Figure 3:
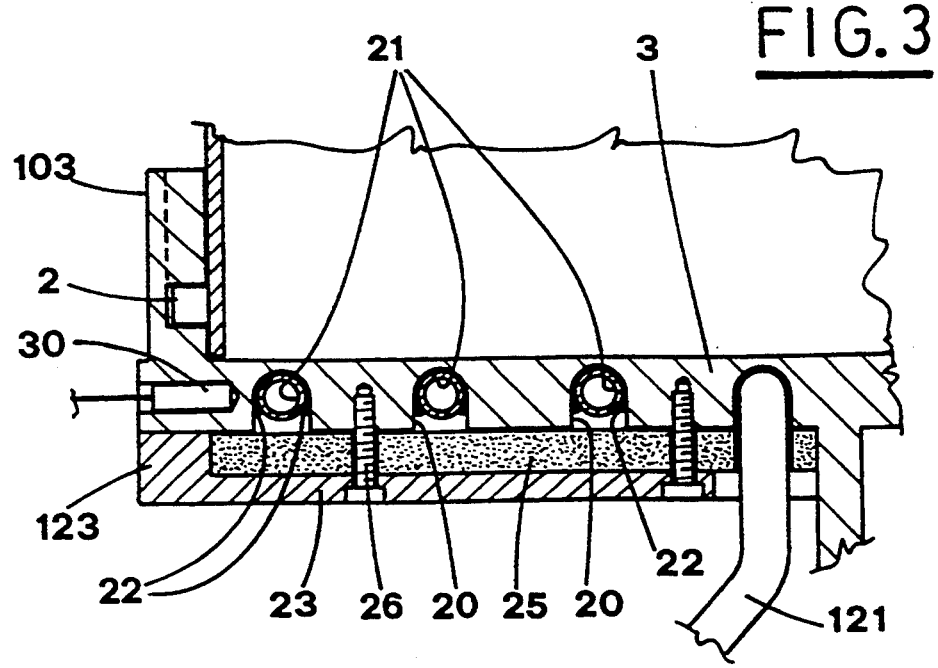
FIG. 3 is a partial cross-sectional view taken along line III—III in FIG. 2.

FIG. 2 clearly shows that the section of the lower outer surface of the feed hopper base plate 3 which is not covered by the box 203 and the cover 403 with ribs 18, represents approximately 50% or more of the base plate's entire surface. With this invention, at least this, uncovered, section of the lower surface of the base plate 3 is cooled. Using any technique, the said surface is formed with at least one continuous channel 20, with any shape, position and depth which allow it to be fitted with at least one coil 21, in a suitable material and conveniently distributed over the said surface. The shape and position of the channel and the coil may, obviously, differ from that illustrated in the diagrams. 121 and 221 indicate the input and output terminals of the coil 21, positioned at right-angles to the base plate 3.

The coil 21 is, in the preferred version, fixed in the relative channel 20, using a mastic with effective heat conducting capacity, as indicated by 22. Subsequently, a bottom 23 which in plan view is "C"-shaped, and whose inner edge rests largely against the box 203, extending as far as the cover 403 and ribs 18, is inserted over the lower face of the base plate 3 by sliding into place. This is shown by the arrow F in FIG. 2 and the continuous and broken line. The central, inner section of this bottom has a small recess 24 to allow for the passage of the terminals 121-221 of the coil 21.

A characteristic feature of the bottom 23 is its raised outer edge 123, high enough to receive a sufficiently thick layer of any effective insulating materials 25, placed between the bottom and parts 3-21 to prevent the outward dispersion of any units of refrigeration. At the points indicated by 26 in FIG. 2, the bottom is screwed, with spacers if required, to the base plate 3.

The bottom is, preferably, made of metal, although any other suitable material may be used, for example a suitable plastic.

The coil 21, which acts as a cooler, is connected by the terminals 121-221 to a small Freon (or similar) cooling unit. FIG. 1 shows a partial view of the unit's compressor 27, whose action is preferably controlled by a thermostat 30 mounted on the base plate 3, like the coil 21. The cooling unit is activated independent of the hamburger maker, so that it can be left running at the end of each work cycle.

The feed hopper base plate 3 should be made thick enough to create a good thermal barrier. In tests carried out by the applicant, good results were obtained by using a base plate 3 with 380 mm diameter which was between 10 and 15 mm thick, preferably 11-12 mm. The coil 21 was made using a tube in copper or another material, with an 8 mm external diameter, and a compressor 27 with a capacity of approximately 250-300 Watts was used.

In contrast to that shown by the diagrams, the bottom 23 may protrude from the perimeter of the base plate 3, with a section formed with channelling and having at least one outlet tube for the collection of any droplets of condensation formed on the outer lateral surface of the upper sections of the feed hopper T, due to the cooling of the base plate 3. If necessary, this function may be carried out by a part other than the bottom 23.

In a further, small variation, not illustrated because it can be imagined and is easily put into effect by technicians in this sector, the base plate rim 103 can be made higher than illustrated, and a lower section of it equipped externally for cooling by the coil 21, which encircles the said section of the rim with one of its coils, protected by suitable insulation and a special cover, partly for reasons of hygiene.

The above description is intended as an example only and is in no way restrictive; any modifications thereto fall within the scope of the above description and the appended claims.

What is claimed is:

1. A hamburger maker machine comprising:
   a feed hopper for receiving minced meat, said hopper including a base plate having a raised annular rim and a tubular body fitted on said rim;
   a rotating volumetric batching unit disposed below said hopper for shaping meat from said hopper into burgers; and
   cooling means in direct contact with said base plate for cooling said base plate and at least limiting a downward dripping of liquids contained in the minced meat by retaining fat particles in said hopper.

2. The device defined in claim 1 wherein said hopper has a lower face, said cooling means including a cooling coil in contact with said lower face of said hopper, said cooling means including a thermostat, further comprising insulating material covering said lower face and said cooling coil, and a cover for covering said insulating material and said cooling coil.

3. The device defined in claim 2 wherein said base plate is provided with a groove, said coil being disposed in said groove, thereby generating a predefined thermal barrier.

4. The device defined in claim 2 wherein said base plate is provided with a groove, said coil being disposed in said groove, thereby generating a predefined thermal barrier.

5. A hamburger maker machine comprising:
   a feed hopper for receiving minced meat, said hopper including a base plate and a tubular body fitted on said base plate, said base plate having an external lower face, a groove being provided in said lower face;
   a rotating volumetric batching unit disposed below said hopper for shaping meat from said hopper into burgers; and
   cooling means in direct contact with said base plate for cooling said base plate and at least limiting a downward dripping of liquids contained in the minced meat by retaining fat particles in said hopper, said cooling means including a cooling coil disposed in said groove.

6. The device defined in claim 5, further comprising a heat-conductive mastic holding said coil in said groove.

7. The device defined in claim 5 wherein said cooling means includes a thermostat, further comprising insulating material covering said lower face and said cooling coil, and a cover for covering said insulating material and said cooling coil.

8. A hamburger maker machine comprising:
   a feed hopper for receiving minced meat, said hopper including a base plate having a raised annular rim and a tubular body fitted on said rim;
   a rotating volumetric batching unit disposed below said hopper for shaping meat from said hopper into burgers; and
   cooling means in operative contact with only said base plate of said hopper for cooling said base plate and at least limiting a downward dripping of liquids contained in the minced meat by retaining fat particles in said hopper.

9. The device defined in claim 8 wherein said hopper has a lower face, said cooling means including a cooling coil in contact with said lower face of said hopper, said cooling means including a thermostat, further comprising insulating material covering said lower face and said cooling coil, also comprising a cover covering said insulating material and said cooling coil.

10. The device defined in claim 9 wherein said base plate is provided with a groove, Said coil being disposed in said groove, thereby generating a predefined thermal barrier.

* * * * *